United States Patent [19]

Amamori et al.

[11] Patent Number: 5,374,078
[45] Date of Patent: Dec. 20, 1994

[54] AIR BAG LID MOUNTING BRACKET HAVING A LOAD TRANSMITTING MEMBER

[75] Inventors: Ichiro Amamori; Akira Kokeguchi, both of Shiga, Japan

[73] Assignee: Takata Corporation, Tokyo, Japan

[21] Appl. No.: 128,154

[22] Filed: Sep. 29, 1993

[30] Foreign Application Priority Data

Oct. 16, 1992 [JP] Japan .................. 4-278487

[51] Int. Cl.⁵ .............................................. B60R 21/20
[52] U.S. Cl. ................................................... 280/728 B
[58] Field of Search ............... 280/728 A, 728 B, 732, 280/731, 730 R, 728 R

[56] References Cited

U.S. PATENT DOCUMENTS

| | | | |
|---|---|---|---|
| 5,060,972 | 10/1991 | Satoh et al. | 280/728 B |
| 5,069,480 | 12/1991 | Good | 280/728 A |
| 5,183,288 | 2/1993 | Inada et al. | 280/728 B |
| 5,190,314 | 3/1993 | Takasugi | 280/732 |
| 5,217,253 | 6/1993 | Pray | 280/728 A |

FOREIGN PATENT DOCUMENTS

| | | | |
|---|---|---|---|
| 5085293 | 4/1993 | Japan | 280/732 |
| 2265337A | 9/1993 | United Kingdom . | |

Primary Examiner—Brian L. Johnson
Assistant Examiner—Peter C. English
Attorney, Agent, or Firm—Kanesaka & Takeuchi

[57] ABSTRACT

An air bag device for a vehicular passenger, includes: a box-shaped container having an open front face; an air bag confined in a folded shape in the container; an inflator attached to the container; a lid covering the front face of the container; a lid mounting bracket disposed along the upper face of the container; and a backup plate forming the lid and having its upper face extended to the back of the lid to provide a lid mounting portion fixed on the lid mounting bracket. Further, a load transmitting member is interposed between the lid mounting bracket and the upper face of the container for transmitting a load, which is applied to the lid mounting bracket toward the container, to the container.

9 Claims, 9 Drawing Sheets

AIR BAG LID MOUNTING BRACKET HAVING A LOAD TRANSMITTING MEMBER

BACKGROUND OF THE INVENTION

1. Field of the Invention

The present invention relates to an air bag device which is mounted in the instrument panel of a vehicle for extending an air bag to protect a passenger at the time of a collision of the vehicle.

2. Description of the Related Art

In the air bag device for a vehicular passenger, a folded air bag and an inflator are confined in a container, and a lid is so attached to the container as to cover the air bag. When the vehicle collides, the inflator operates to inflate the air bag. Then, the lid is pushed by the air bag being expanded and is opened into the cabin so that the air bag is largely extended into the cabin to protect the passenger.

In FIGS. 5 to 7 showing an air bag device of the prior art: FIG. 5 is a schematic perspective view showing the overall structure before the air bag is inflated; FIG. 6 is a side elevation; and FIG. 7 is an exploded perspective view.

In this air bag device 10, a lid 14 is attached to the open front face of a box-shaped container 12. An inflator 16 is fixed in the container 12. An air bag 18 is folded and fitted in the container 12 and is fixed by means of bolts 19 to side portions 12S.

The container 12 is formed in its upper and lower walls with a number of aspiration holes 20. When the inflator 16 is activated to inject its gases into the container 12 to inflate the air bag 18, air flows through those aspiration holes 20 into the container 12 to extend the air bag 18 quickly.

The lid 14 is composed of a backup plate 22 made of an aluminum alloy and a soft cover 24 covering the front face of the plate 22. This plate 22 has its upper edge extending over the container 12 to provide a lid mount 26.

To the upper face of the container 12, there is spot-welded a lid mounting bracket 28. This lid mounting bracket 28 is extended along the upper face of the container 12 and formed with a number of bolt holes 30. The lid mount 26 is also formed with a number of corresponding bolt holes 32, through which it is fixed on the lid mounting bracket 28 by means of bolts 84 and nuts.

As shown in FIG. 7, the container 12 has its back face recessed to receive the inflator 16. Moreover, this back face is slitted at 36 to introduce the injected gases of the inflator 16 into the container 12. The inflator 16 is held in the container 12 by an inflator cover 38. This inflator cover 38 is fixed on the container 12 by means of bolts 40. Numeral 42 designates slits for passing the bolts 40 therethrough. When the inflator 16 operates, the lid 14 is pushed, as indicated in broken line 14A, by the air bag, and is opened into the cabin, as shown by an arrow 14B.

Incidentally, the inflator 16 is thus arranged on the back of the container 12 but may be arranged in the container 12.

The air bag device for a vehicular passenger of this kind has to damp the impact which is caused when the passenger hits it or the instrument panel over it. In the prior art, therefore, the air bag device for a vehicular passenger has its container and the like constructed such that it is gradually deformed to absorb the impact, if applied.

OBJECT AND SUMMARY OF THE INVENTION

An object of the present invention is to provide a structure of an air bag device for a vehicular passenger, which can absorb an impacting load sufficiently when this load is applied in a direction from a lid mounting bracket to a container.

According to the present invention, there is provided an air bag device for a vehicular passenger, which comprises: a box-shaped container having an open front face; an air bag confined in a folded shape in the container; an inflator attached to the container; a lid covering the front face of the container; a lid mounting bracket disposed along the upper face of the container; and a backup plate forming the lid and having its upper face extended to the back of the lid to provide a lid mounting portion fixed on the lid mounting bracket, wherein the improvement comprises a load transmitting member interposed between the lid mounting bracket and the upper face of the container for transmitting a load, which is applied to the lid mounting bracket toward the container, to the container.

If a load is applied to the air bag device for a vehicular passenger of the present invention in a direction from the lid mounting bracket to the container, it is transmitted from the lid mounting bracket to the container through the load transmitting member. Thus, the container is gradually deformed by the load transmitted, to absorb the load (or impact) sufficiently.

DESCRIPTION OF THE PREFERRED EMBODIMENTS

Figure 1:
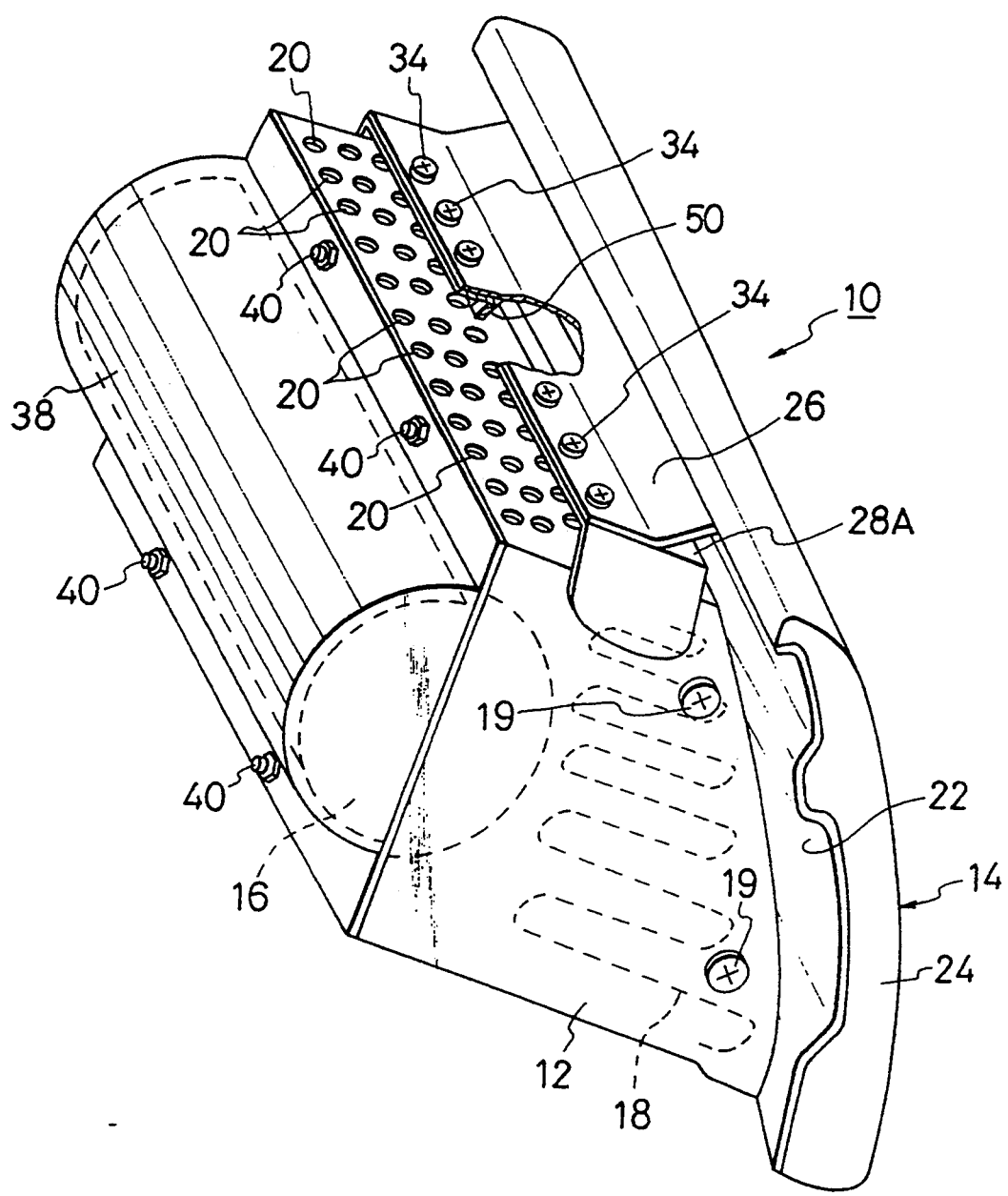
FIG. 1 is a perspective view showing an air bag device for a vehicular passenger according to an embodiment of the present invention.
Figure 2:
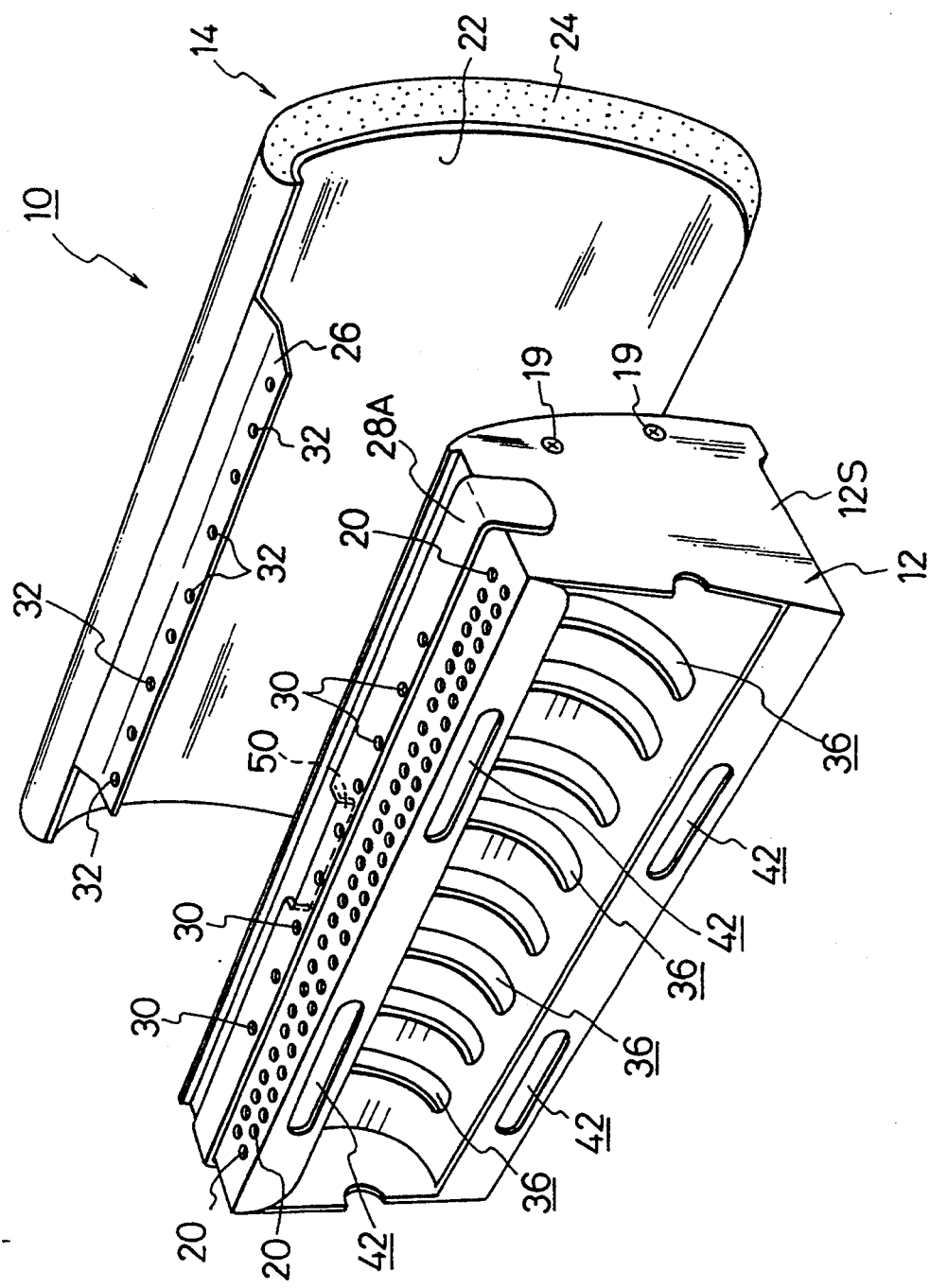
FIG. 2 is a side elevation view showing the air bag device for a vehicular passenger of the embodiment.
Figure 3:
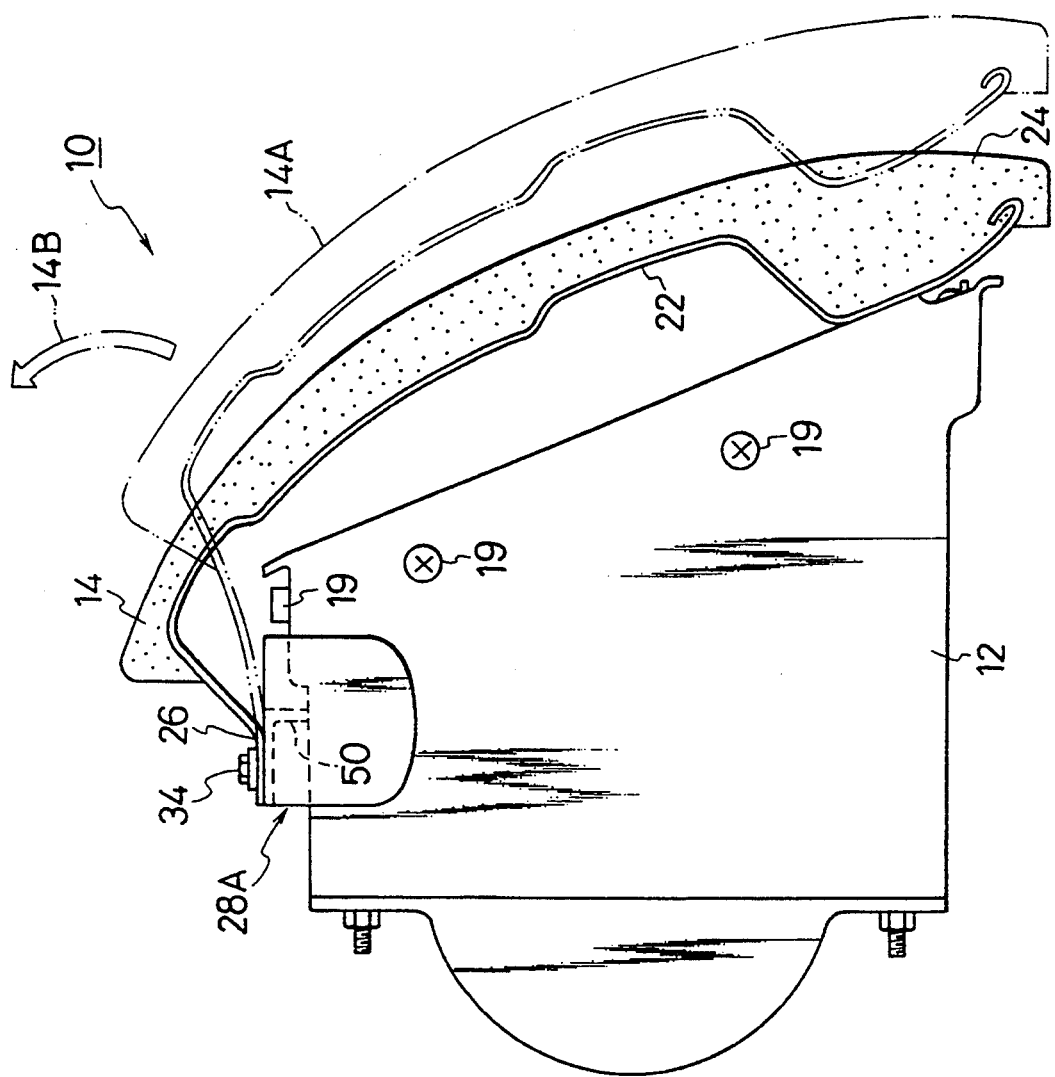
FIG. 3 is an exploded perspective view showing the air bag device for a vehicular passenger of the embodiment.
Figure 4:
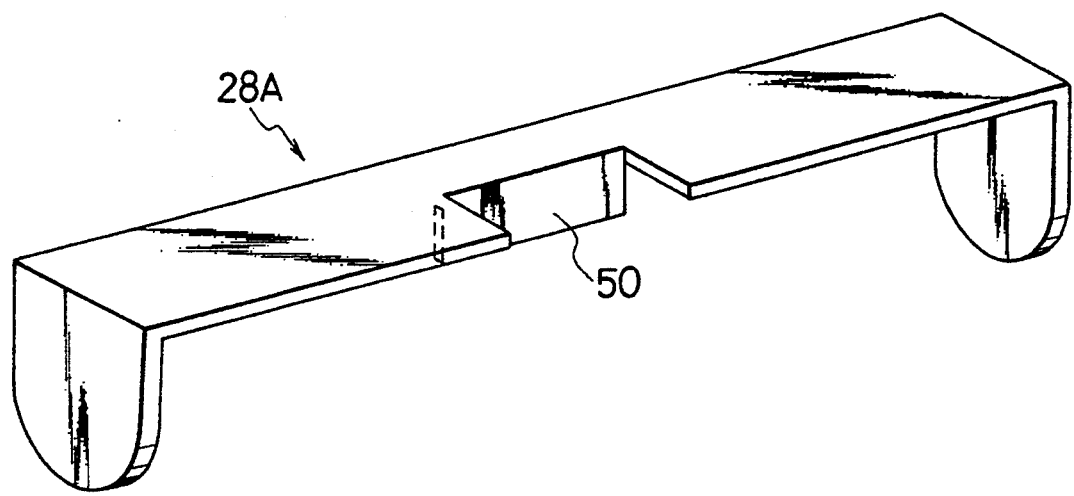
FIG. 4 is a perspective view showing a lid mounting bracket 28A.

The present invention will be described in the following in connection with its embodiments with reference to the accompanying drawings. FIG. 1 is a partially broken perspective view showing an air bag device for a vehicular passenger according to an embodiment; FIG. 2 is an exploded perspective view showing the air bag device for a vehicular passenger; FIG. 3 is a side elevation view showing the air bag device for a vehicular passenger; and FIG. 4 is a perspective view showing a lid mounting bracket of the air bag device for a vehicular passenger.

Figure 5:
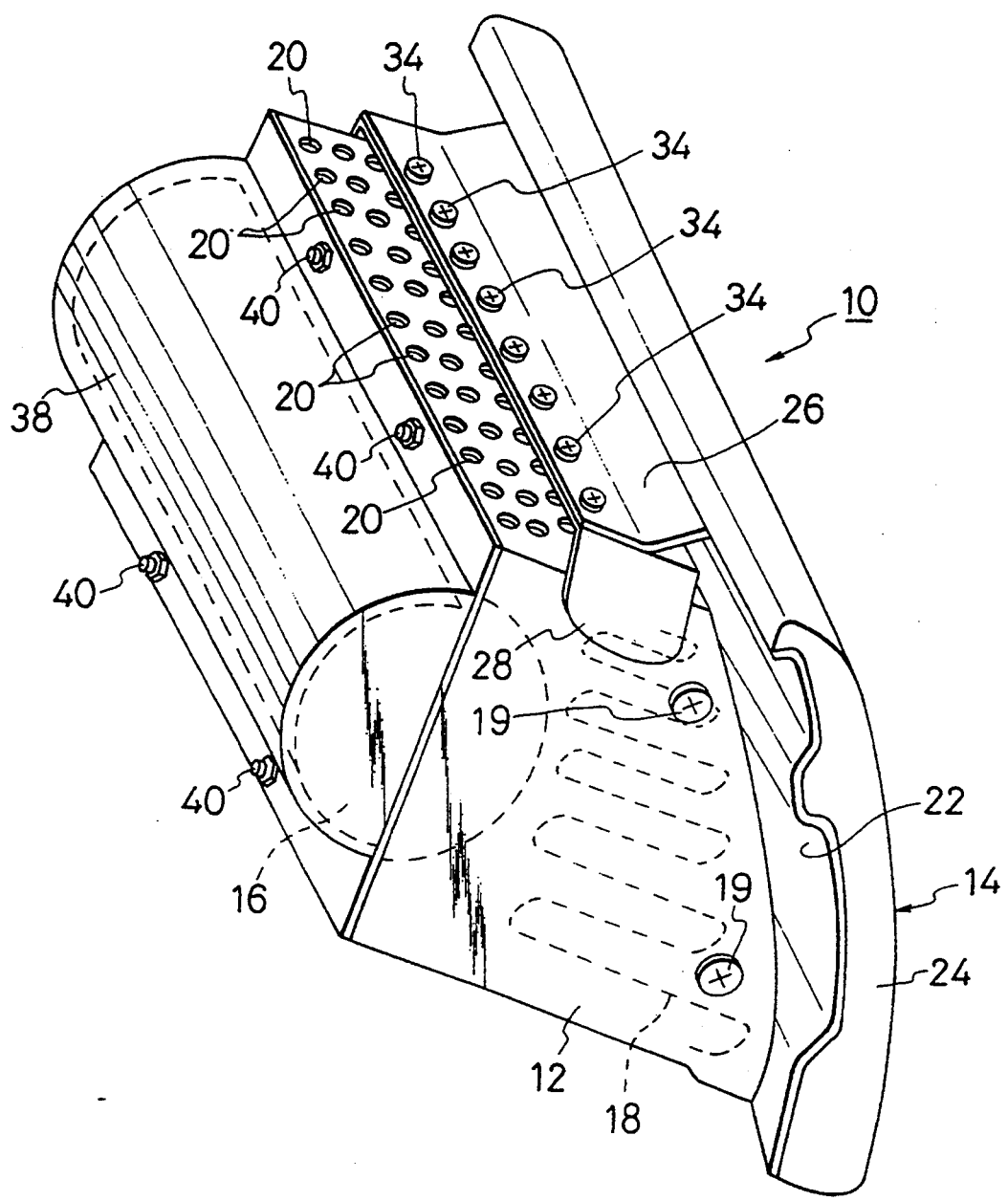
FIG. 5 is a perspective view showing the air bag device for a vehicular passenger according to the prior art.
Figure 6:
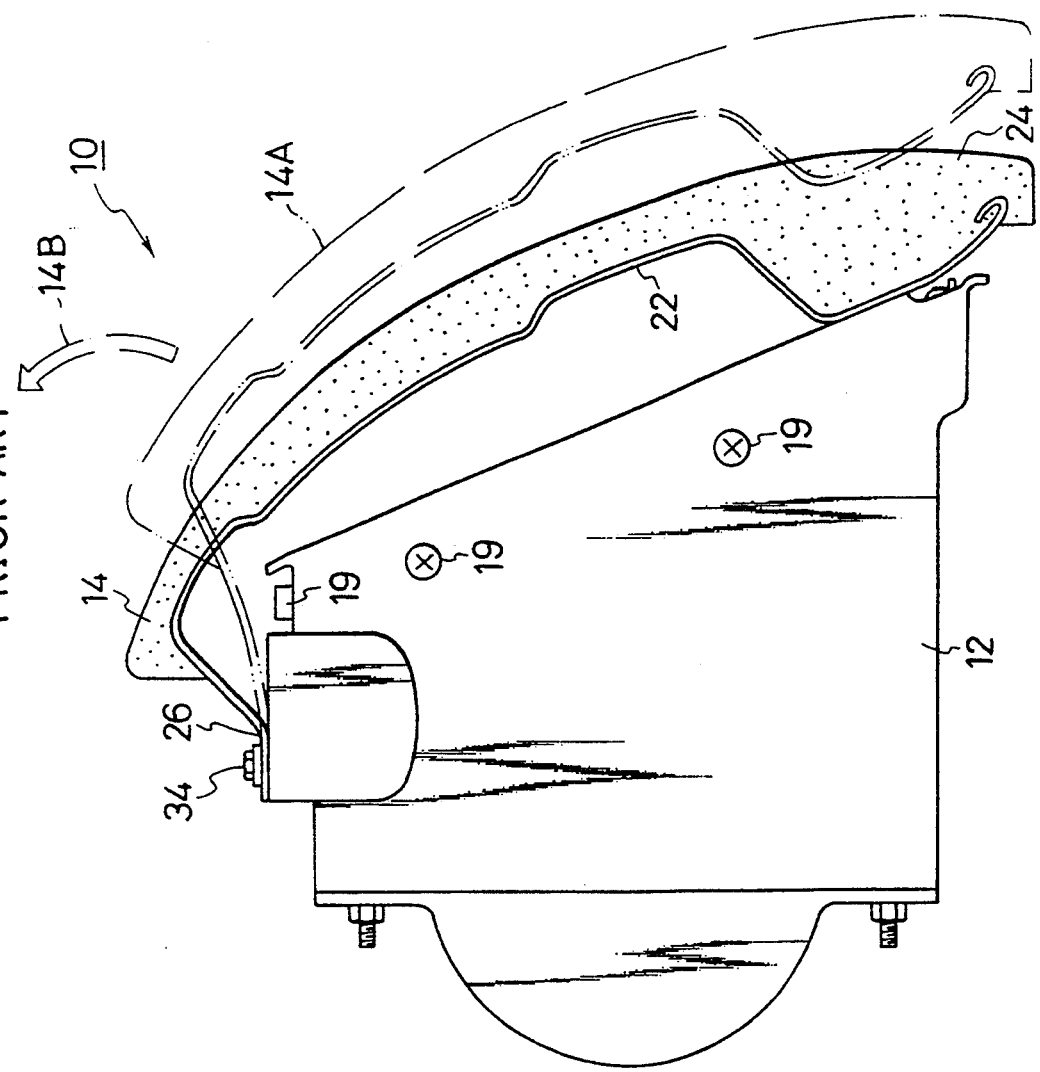
FIG. 6 is a section view showing the air bag device for a vehicular passenger of the prior art.
Figure 7:
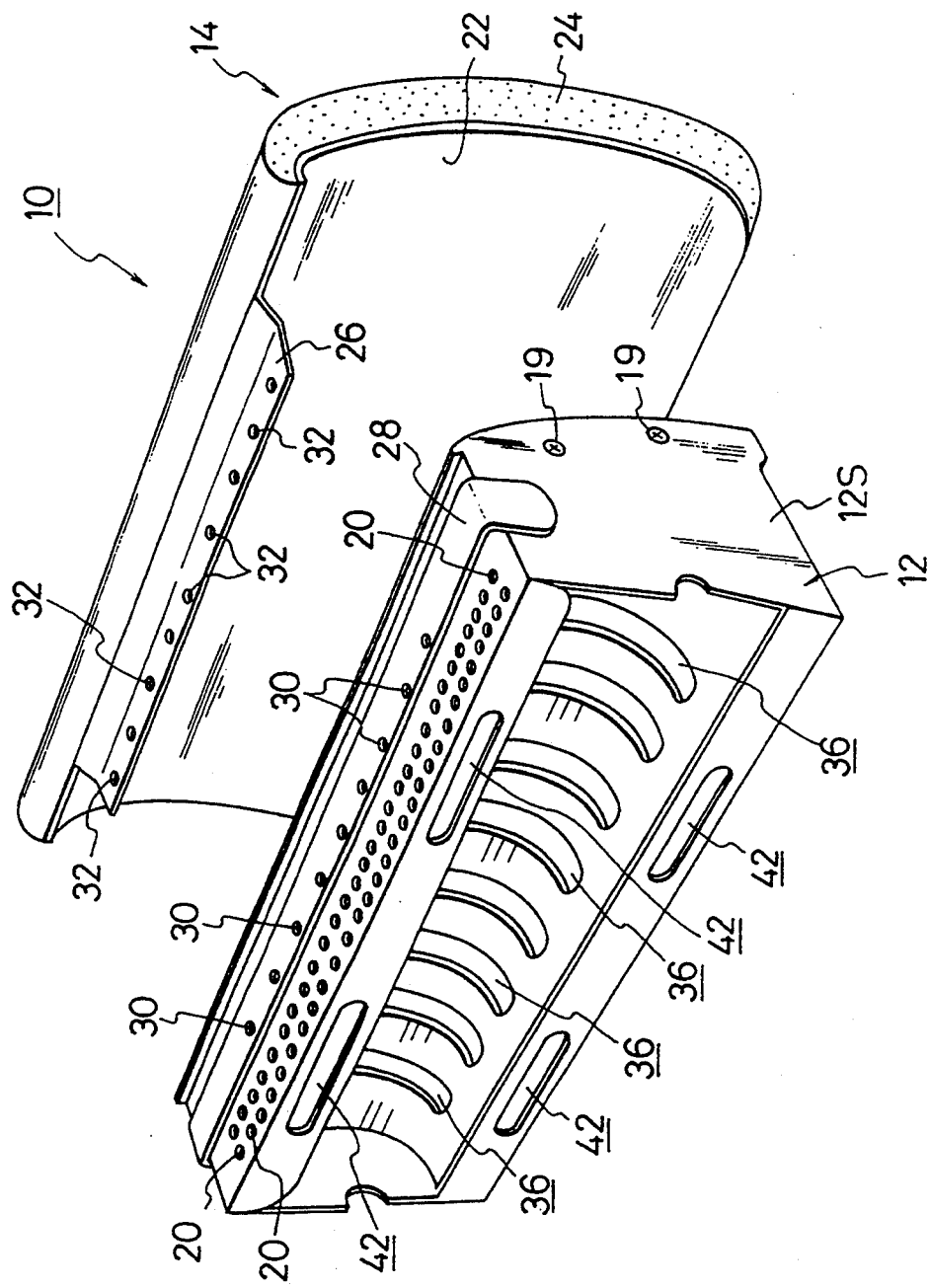
FIG. 7 is an exploded perspective view showing the air bag device for a vehicular passenger of the prior art.

In the present embodiment, a lid mounting bracket 28A is partially folded down at its longitudinal center portion to form a load transmitting member 50. This load transmitting member 50 has its leading end abutting against the upper face of the container 12. The impacting load, if applied downward to the lid mounting bracket 28A, is transmitted to the container 12 through that load transmitting member 50, so that it is absorbed through the deformation of the container 12. Incidentally, the remaining construction of the air bag device for a vehicular passenger is identical to that of the prior art shown in FIGS. 5 to 7, and the common reference numerals designate the identical portions.

Figure 8:
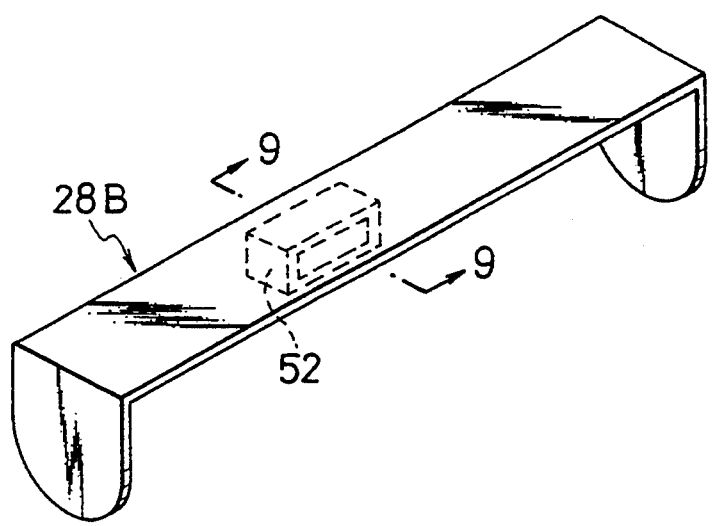
FIG. 8 is a perspective view showing a lid mounting bracket 28B to be used in the air bag device for a vehicular passenger according to another embodiment.
Figure 9:
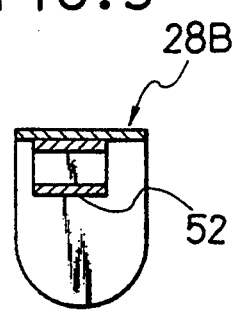
FIG. 9 is a section view taken along line 9—9 of FIG. 8.
Figure 10:
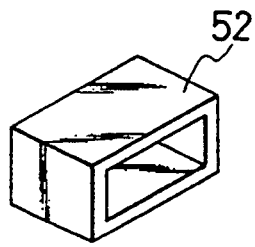
FIG. 10 is a perspective view showing a load transmitting member 52.

FIG. 8 is a perspective view showing a lid mounting bracket 28B having a load transmitting member 52; FIG. 9 is a section view taken along line 9—9 of FIG. 8; and FIG. 10 is a perspective view showing the load transmitting member 52. This load transmitting member 52 is formed into a rectangular tube and is welded to the lower face of the lid mounting bracket 28B. This lid mounting bracket 28B in turn is so attached to the container that the load transmitting member 52 abuts against the upper face of the container.

Figure 11:
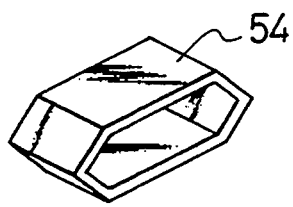
FIG. 11 is a perspective view showing a load transmitting member 54.
Figure 12:
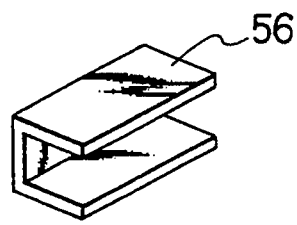
FIG. 12 is a perspective view showing a load transmitting member 56.
Figure 13:
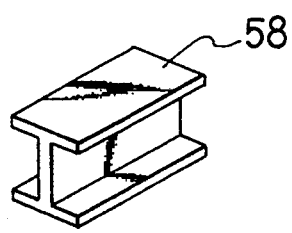
FIG. 13 is a perspective view showing a load transmitting member 58.
Figure 14:
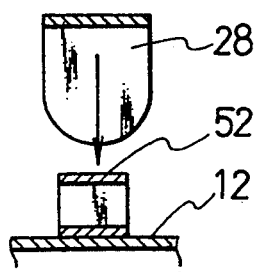
FIG. 14 is an exploded section view showing an essential portion of an air bag device for a vehicular passenger according to still another embodiment.

This load transmitting member 52 of the rectangular tube may be replaced by a load transmitting member 54 of a hexagonal tube, a load transmitting member 56 having a U-shaped cross section or a load transmitting member 58 having an I-shaped cross section, as shown in FIGS. 11 to 13. Moreover, each of these load transmitting members may be welded in advance to the container 12, as shown in FIG. 14 (presenting a section of a portion similar to that of FIG. 9). Still moreover, a plurality of load transmitting members may be provided. In this case, some of the load transmitting members may be fixed on the lid mounting bracket whereas the others may be fixed on the container.

As apparent from the embodiments thus far described, according to the air bag device for a vehicular passenger of the present invention, an impacting load, if applied in the direction from the lid mounting bracket to the container, is transmitted through the load transmitting member or members to the container. Thus, the impacting load is sufficiently absorbed by the plastic deformation of the upper face of the container.

What is claimed is:

1. An air bag device for a vehicular passenger, comprising:
   a box-shaped container having an open front face;
   an air bag confined in a folded shape in said container;
   an inflator attached to said container;
   a lid covering the front face of said container;
   a lid mounting bracket attached to said container and disposed along an upper face of said container; and
   a backup plate forming said lid and having an upper face extended to the back of said lid to provide a lid mounting portion fixed on said lid mounting bracket,
   wherein the improvement comprises a load transmitting member interposed between said lid mounting bracket and the upper face of said container for transmitting a load, which is applied to said lid mounting bracket toward said container, to said container.

2. An air bag device for a vehicular passenger according to claim 1, wherein said load transmitting member is formed of a folded portion provided at a longitudinal center portion of said lid mounting bracket.

3. An air bag device for a vehicular passenger according to claim 1, wherein said load transmitting member is separate from said lid mounting bracket.

4. An air bag device for a vehicular passenger according to claim 3, wherein said load transmitting member is tubular.

5. An air bag device for a vehicular passenger according to claim 4, wherein said load transmitting member is formed into a rectangular tube.

6. An air bag device for a vehicular passenger according to claim 4, wherein said load transmitting member is formed into a hexagonal tube.

7. An air bag device for a vehicular passenger according to claim 3, wherein said load transmitting member has a U-shaped cross section.

8. An air bag device for a vehicular passenger according to claim 3, wherein said load transmitting member has a I-shaped cross section.

9. An air bag device for a vehicular passenger according to claim 3, wherein said load transmitting member is fixed on at least one of said lid mounting bracket and said container.

* * * * *